Feb. 23, 1960 E. E. BOON 2,925,649
METHOD OF FORMING A BLADE
Filed Aug. 17, 1953 9 Sheets-Sheet 3

Fig.3.

INVENTOR
E. E. BOON
BY Wilkinson & Mawhinney
ATTYS.

Feb. 23, 1960  E. E. BOON  2,925,649
METHOD OF FORMING A BLADE
Filed Aug. 17, 1953  9 Sheets-Sheet 4

INVENTOR
E. E. BOON
BY:- Wilkinson & Mawhinney
ATTYS.

Feb. 23, 1960  E. E. BOON  2,925,649
METHOD OF FORMING A BLADE
Filed Aug. 17, 1953  9 Sheets-Sheet 5

Fig.5.

INVENTOR
E.E. BOON
BY:- Wilkinson & Mawhinney
ATTYS.

Feb. 23, 1960 E. E. BOON 2,925,649
METHOD OF FORMING A BLADE
Filed Aug. 17, 1953 9 Sheets-Sheet 7

Fig. 7.

INVENTOR
E. E. BOON
BY Wilkinson & Mawhinney
ATTYS.

Feb. 23, 1960 E. E. BOON 2,925,649
METHOD OF FORMING A BLADE
Filed Aug. 17, 1953 9 Sheets-Sheet 9

INVENTOR
E. E. BOON
BY Wilkinson & Mawhinney
ATT'YS

United States Patent Office 2,925,649
Patented Feb. 23, 1960

2,925,649

METHOD OF FORMING A BLADE

Ernest Edwin Boon, Derby, England, assignor to Rolls-Royce Limited, Derby, England, a British company Application August 17, 1953, Serial No. 374,676

Claims priority, application Great Britain August 28, 1952

2 Claims. (Cl. 29—156.8)

This invention relates to methods for working metals and is concerned more particularly with methods of and apparatus for working strip-like metal pieces to form blades for compressors or turbines such as form parts of gas-turbine engines.

The manufacture of such blades by the methods hitherto commonly employed is expensive. To reduce manufacturing costs, it has therefore been proposed to manufacture such blades by cutting off blade lengths from a strip of uniform aerofoil cross-section and thereafter, if desired, imparting a twist to the blade; such blades therefore have at each point along their length a uniform aerodynamic cross-section, this may give the blade undesired aerodynamic characteristics.

This invention has for an object to provide an improved method for producing blades from uniform cross-section strip, whereby the blades may have a desired aerodynamic characteristic at each cross-section along their length.

According to the present invention a method of producing turbine or compressor blades comprises cutting off blade lengths from strip material of uniform basic aerodynamic cross-section and modifying the blade lengths to give a desired aerodynamic cross-section at each point in the blade length by an operation in which the blade length is passed between rotating shaped rollers at a linear speed equal to the peripheral speed of the working surfaces of the rollers, the working surfaces having at each angular location such a cross-sectional profile as to modify by pressing the camber of the basic section. By the term "pressing" is meant that there is no substantial displacement of material from one cross-section to an adjacent cross-section or within a cross-section.

Preferably means, such as clamp means, are provided for rotating the end of the blade length issuing from the rollers angularly about an axis substantially co-linear with the lengthwise axis of the blade length to impart twist to the blade along its length as it issues from the rollers. This invention may thus permit the production of blades having desired aerodynamic characteristics at each cross-section along their length, and such cross-section may have a preselected angle of attack determined by the twist imparted to the blade along its length.

It will be appreciated that with certain materials there may be a tendency to "spring back" after the blade length has left the rollers, and it may therefore be desirable to shape the rollers in such a manner as to modify the camber in the passage of the blade length through the rollers to an extent greater than that ultimately desired.

According to a feature of the invention the twist per unit length of the blade length at differing points along its length may be varied by appropriately selecting the angular rotation per unit length issued from the rollers. Such angular rotation per unit length will be selected to take into account any tendency for the twist imparted to accommodate itself uniformly throughout the issued length of the blade, it being borne in mind that issued length increases as the blade length issues from the rollers.

According to the present invention in another aspect, apparatus for producing a turbine or compressor blade from a workpiece formed by a blade length of strip having a uniform aerodynamic cross-section at each point in its length, comprises a pair of rotatable shaping rollers arranged to form a bite through which the workpiece is passed to be pressed to modify the camber of the strip, means to load the shaping rollers into contact with the workpiece, means to feed the workpiece through the bite and means interconnecting the shaping rollers and the means to feed the workpiece through the bite such that the peripheral speed of the rollers is equal to the linear speed of the workpiece, the shaping rollers having working surfaces around their peripheries, which working surfaces have axial profiles such as to form at each instant a bite to give a desired aerodynamic profile to the workpiece at the corresponding point in its length.

Preferably the means to feed the workpiece through the bite comprises clamping means to grip the leading end of the workpiece and power means to move said clamping means to draw the workpiece through the bite.

If it desired to impart a twist to the blade there is provided according to a feature of this invention, means to rotate the leading end of the workpiece about the lengthwise axis of the workpiece and relative to the bite as the workpiece issues from the bite. For instance, where the workpiece is drawn through the bite the clamping means for holding the leading end may be mounted to be rotated about the longitudinal axis of the workpiece and relative to the bite and means provided to control the extent of rotation at each point in the travel of the clamping means.

In one arrangement the clamping means may be rotated by providing a tubular guide for the clamping means as it draws the workpiece through the bite and a peg on the clamping means to work in a slot in the tubular guide to determine the angular position of the clamping means about the axis.

In a second arrangement, there is provided a member movable transversely to the direction of travel of said clamping means as the workpiece leaves the shaping rollers, said member being connected to said clamping means to cause rotation thereof about an axis parallel to said direction, and cam means extending in the direction of travel of said clamping means and arranged to cause the transverse movement of said member, for instance, said member may comprise a rack which co-operates with a pinion connected to rotate with the clamping means and may also comprise a follower device co-operating with the cam means. The cam means comprises an adjustable cam device and the follower carried by the member moved under control of the cam may comprise a tricycle roller arrangement, two rollers of the tricycle arrangement co-operating with one surface of the flexible strip affording the cam surface and the third roller co-operating with the opposite surface thereof.

According to a feature of the apparatus of this invention, the one shaping roller may be mounted for angular adjustment about the axis of rotation of the other shaping roller whereby when twisted blades are being produced one roller may be offset with respect to the other roller relative to the direction of travel of the workpiece through the bite. When twisted blades are being produced and the axes of the rollers are contained in a plane at right angles to the direction of travel of the workpiece, there is a tendency for the resulting blade to be bowed, but by offsetting the one roller with respect to the other as above set forth the bowing of the blade may be avoided.

Two constructions of apparatus for producing twisted turbine or compressor blades having a varying aerofoil cross-section from strip having a uniform aerofoil cross-section will now be described by way of example, and the description will make reference to the accompanying drawings in which.

Referring to the drawings, each construction of the blade twisting and shaping apparatus comprises a machine bed 10 having thereon at one end a roller base comprising a pair of spaced side plates 11 in which is journalled through bush bearings 12 a spindle 13 having secured thereon at a point between the side plates 11 a first shaping roller 14 and to one side of the shaping roller a first pinion 15. One end of the spindle 13 projects beyond one of the side plates 11 and this end of the spindle has secured on it a second pinion 16 which in the construction of Figures 1 to 5 is of the spur gear type and in the other construction is a bevel gear.

Pivoted to the side plates 11 through the bushes 12 so to rock about the axis of rotation of the spindle 13 there is provided a swinging frame including two heavy side plates 17 and a top member 18 interconnecting the side plates 17, the side plates having formed in them vertical guideways to receive a heavy side block 19 in which is journalled a second spindle 20 on which is mounted between the side plates a second shaping roller 21. One end of the second spindle 20 projects beyond one side plate 17 of the swing frame and this end of the spindle carries a third pinion 22 which is disposed above but spaced from the second pinion 16 and which is in one case a spur type gear and in the other case a bevel gear.

The angular position of the swinging frame 17, 18 is adjusted with respect to the machine bed 10 by means of a turnbuckle arrangement 23 extending between forked lugs 24, 25 fixed to the roller base and to the swinging frame 17, 18 respectively. Means is provided to lock the swinging frame 17, 18 in a position of angular adjustment with respect to the machine bed 10 and this means may comprise for each side plate 17 a bolt 26 engaged in a threaded bore in the swinging frame 17, 18 and working in an arcuate slot 27 in the adjacent side plate 11 of the roller base. When it is desired to clamp the swinging frame 17, 18 in position the bolts 26 are tightened to grip the side plates 11.

Formed integrally with top member 18 of the swinging frame 17, 18, there is the cylinder 28 of a pneumatic ram and the piston 29 of the ram is connected to apply a load to the side block 19 so as to urge the second shaping roller 21 towards the first shaping roller 14.

In the arrangement of Figures 1 to 5, the two spindles 13, 20 are geared together so that they rotate in opposite directions through the second and third pinions 16, 22 which mesh respectively with first and second idler pinions 30, 31, the idler pinions themselves intermeshing. The spindle 32 of idler pinion 30 is mounted in that one of the side plates 17 of the swinging frame from which the second spindle 20 projects and the spindle 32 also acts as a pivot for a pivoted arm 33 wherein is mounted a spindle 34 for the second idler pinion 31. The arm is loaded by a spring 35 so that the pinion 31 is held in mesh with the pinion 22 and so a drive is transmitted even when the bearing block 19 for the second spindle 20 moves vertically in its guides.

In the construction of Figures 6 to 10, the two bevel gears 16, 22 are interconnected by a shaft 36 extending between them and carrying a pair of bevel pinions 37, 38, one meshing with each of the bevel gears 16, 22 on the spindles 13, 20. The lower end of the shaft 36 is journalled in a bracket 39 which swings about the axis of the spindle 13 and the upper end of the shaft is supported in a bracket 40 carried by the slide block 19 by having the bevel pinion 38 which meshes with the bevel gear 22 on the second spindle 20 journalled in the bracket 40 and arranged to be capable of sliding along the shaft but drivingly connected thereto by splines. This arrangement accommodates movements of the upper bevel gears 22, 38, due to lifting of the shaping roller 21.

In each construction, there may be provided a gear cover 46.

The shaping rollers 14, 21 are arranged for rotation by a rack 41 which meshes with the first pinion 15 and is supported to move with means for drawing a workpiece through the bite formed by the shaping rollers 14, 21 so that the linear speed of travel of the workpiece is equal to the peripheral speed of the working surfaces of the shaping rollers.

Figure 1:
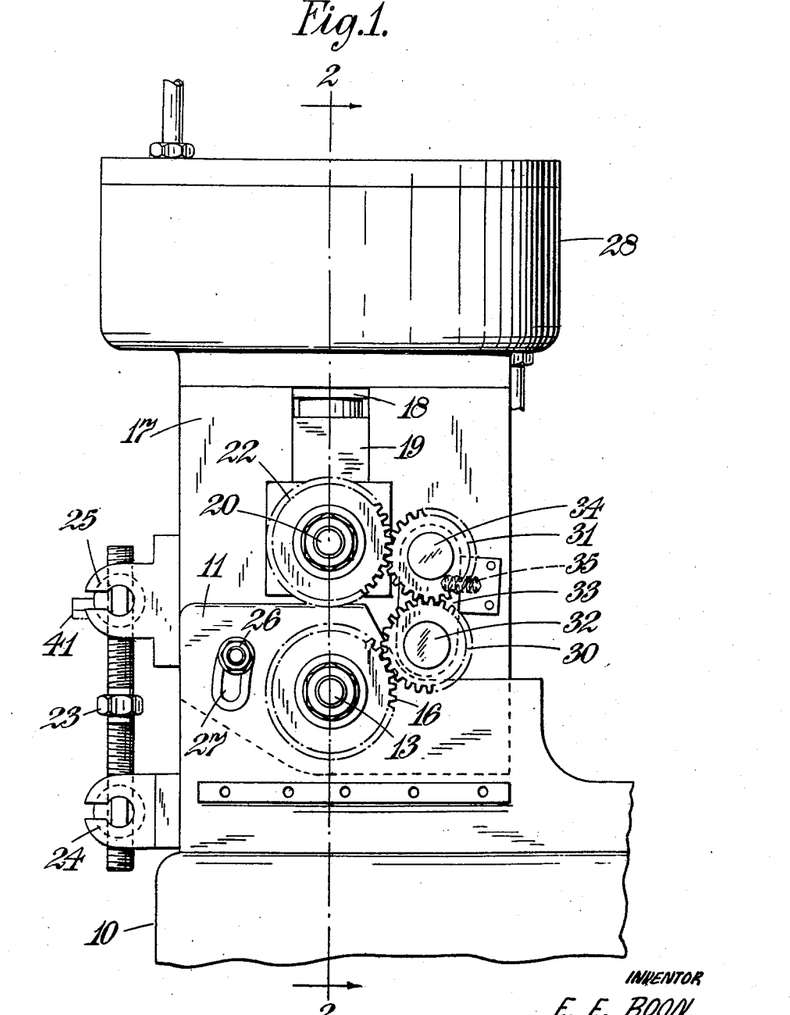
Figure 1 is a side view of part of one construction of the apparatus, and with a gear casing removed.
Figure 2:
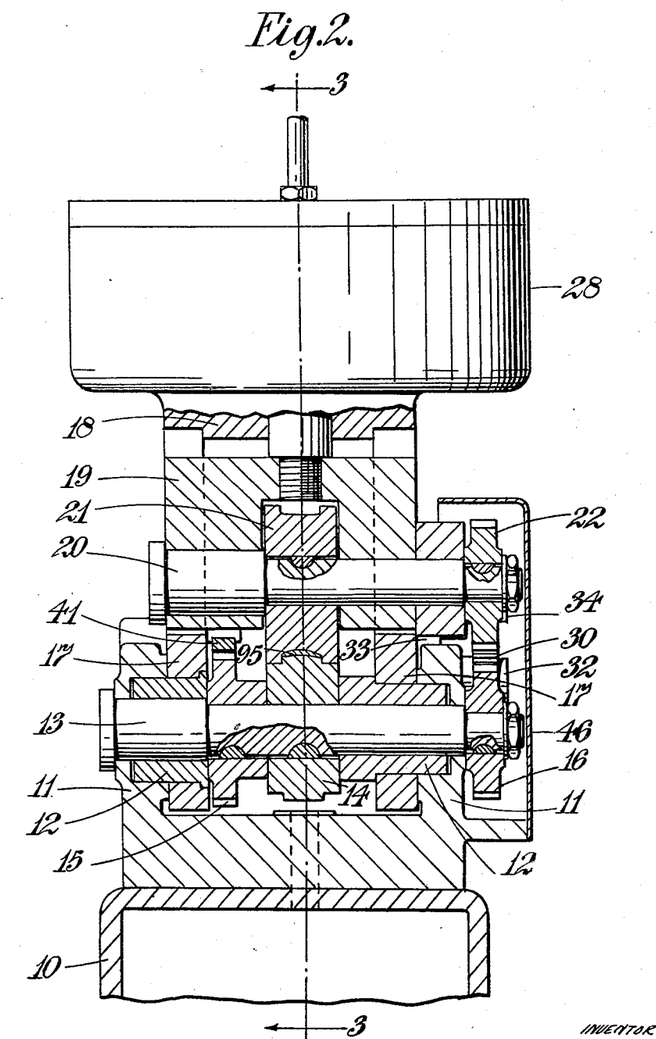
Figure 2 is a section on the line 2—2 of Figure 1.
Figure 3:
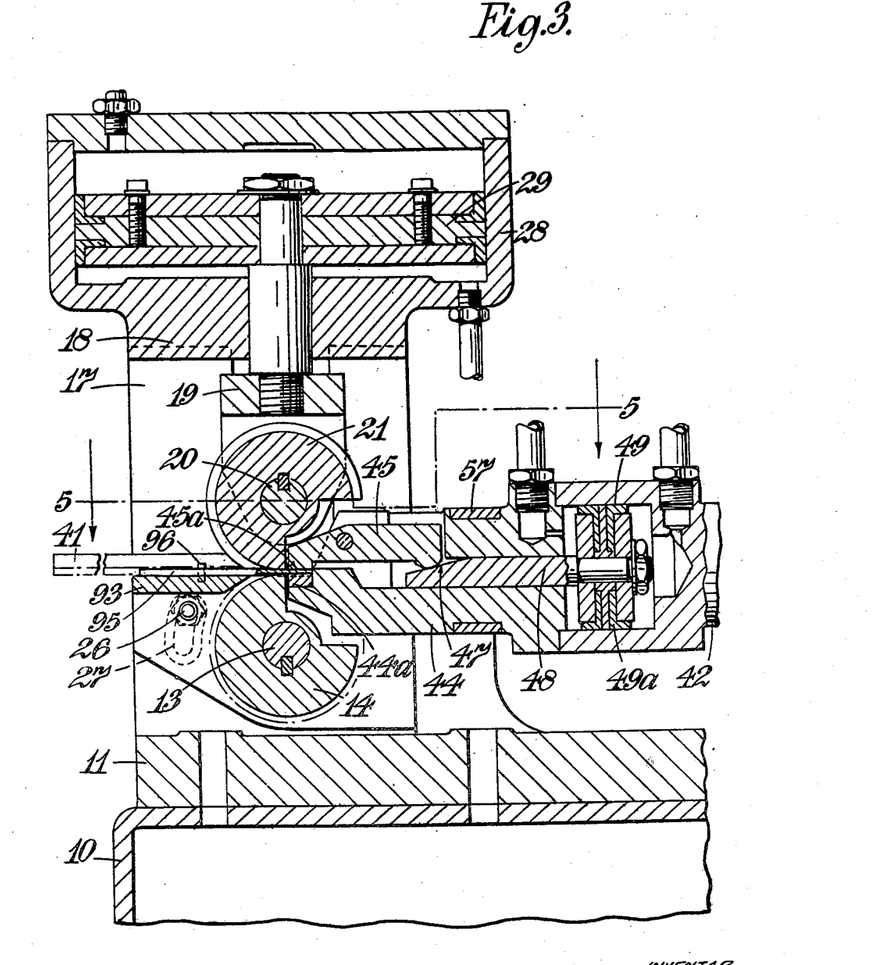
Figure 3 is a section on the line 3—3 of Figure 2.
Figure 4:
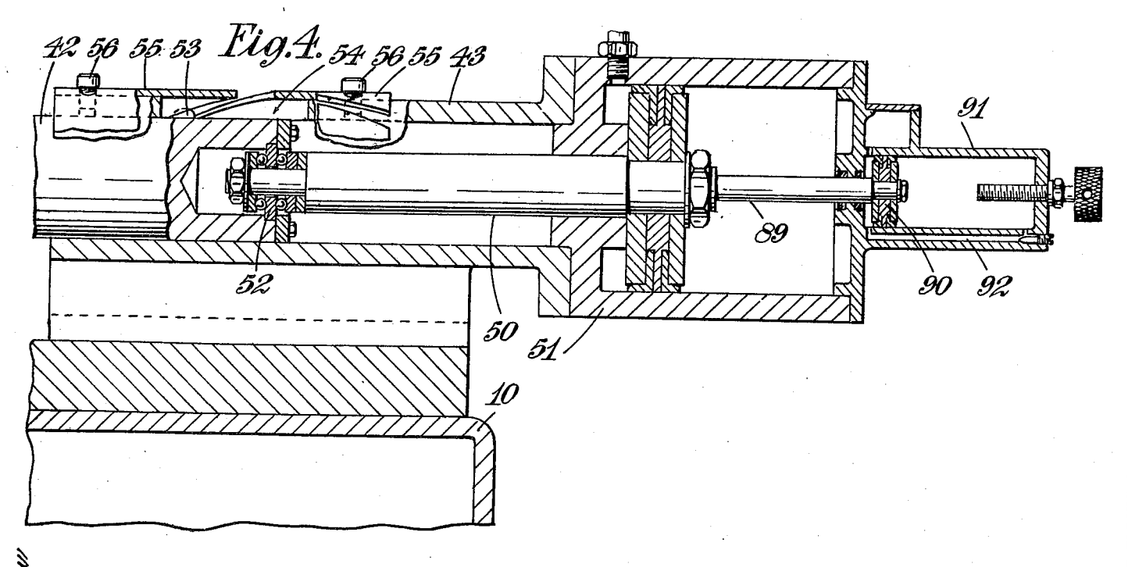
Figure 4 is an extension to the right of Figure 3 and showing the remainder of the apparatus.
Figure 5:
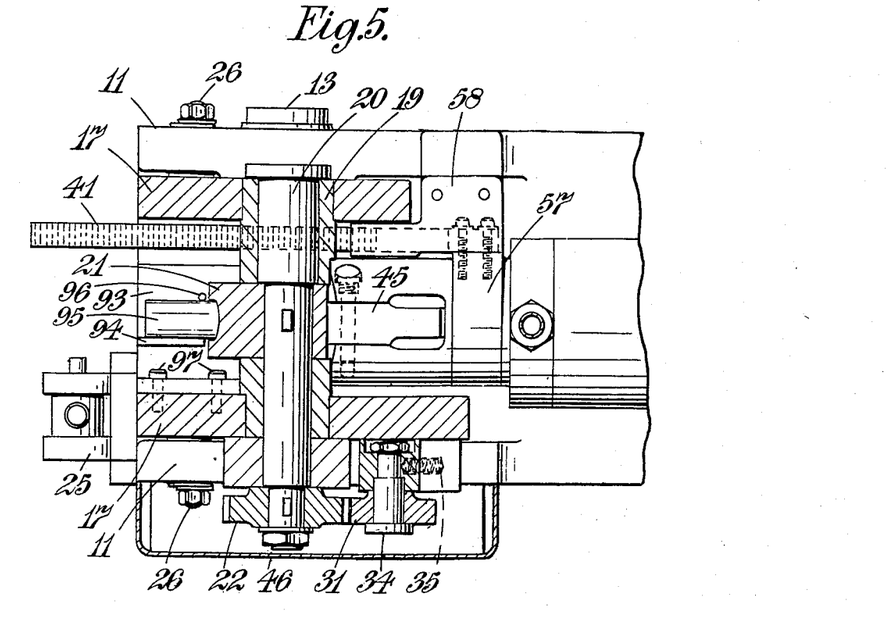
Figure 5 is a section on the line 5—5 of Figure 3.

Referring now to Figures 3 to 5, the means to draw the workpiece through the bite comprises a cylindrical member 42 which is slidably mounted in a cylindrical tubular guide 43 mounted on the machine bed 10. The member 42 slides towards and away from the bite, and has at its end workpiece clamping means. The clamping means comprises a cylindrical member 44 with a longitudinal cutaway and having at its end remote from member 42 a pad 44a shaped to fit within the concave surface of the workpiece and also a pivoted lever 45, which works in the cutaway of member 44, one end of which is formed as a clamp pad 45a for the convex surface of the workpiece and the opposite end of which is engaged by a wedge surface 47 at the end of the piston rod 48 of a pneumatically-operated clamp ram 49, and it is arranged that when compressed air is supplied to move the piston 49a of the ram 49 towards the clamp means the wedge 47 rocks the lever 45 in a direction to grip a workpiece between the two clamp pads 44a, 45a.

The cylindrical member 42 is connected at its end remote from the workpiece clamping means to the piston rod 50 of a main operating ram 51, the connection being through a thrust bearing arrangement 52 to permit the cylindrical member 42 to rotate about its axis relative to the piston rod 50 of the main operating ram 51.

The cylindrical member 42 carries a radial peg 53 which projects through a cutaway 54 in the tubular guide to engage between the edges of a pair of profile plates 55 which form guides for the peg 53. As the cylindrical member 42 is moved lengthwise of the tubular guide 43 by the main operating ram 51 the peg 53 co-operates with the profile plates 55 to rotate the member 42 about its axis. The profile plates 55 are secured to the tubular guide by setscrews 56 passing through circumferential slots in the profile plates 55 to enable these plates to be adjusted angularly about the axis of the cylindrical member. The rack 41 is secured to a collar 57 rotatable on the member 44 and runs in a guide bracket 58 so that although the rack 41 moves with the member 44 it does not rotate with it.

Referring now to Figures 7 to 10, the means for drawing the workpiece through the shaping rollers comprises a main pneumatic ram 60 mounted on the bed plate 10 at the opposite end thereof from the rollers 14, 21. The main pneumatic ram 60 is disposed with its axis horizontal and directed towards the bite of the shaping rollers. A pair of heavy guides 61 extend from the sockets 62 on the ram cylinder to sockets 63 on the side plates 17 adjacent the shaping rollers, and these guides 61 support a sliding head 64 which is connected to the piston rod 65 of the ram piston 66. On reciprocation of the ram piston 66 in the ram cyinder 60, the sliding head 64 is moved backwards and forwards along the guides 61 towards and away from the shaping rollers 14, 21.

In this construction of the apparatus the rack 41 is connected to the sliding head 64 by a turnbuckle device 72 and a plate 73 supported on bolts 74 threaded into the sliding head 64.

The sliding head 64 is hollow and has mounted in axially-spaced bearings 67 in it the workpiece clamping device by which the end of a workpiece issuing from the shaping rollers is gripped. The clamped device is as above described for the first construction. The portion of the clamping device engaged in the spaced bearings is in the nature of a stub shaft 68 and it has secured on it between the bearings 67 a sleeve formed externally as a pinion 69. The turnbuckle device 72 allows of adjustment of the rack 41 and with it the shaping rollers 14, 21 relative to the clamping device.

The sliding head 64 also supports a member 70 engaged in guides 71 (Figure 10) in the sliding head 64 so as to be movable relative to the sliding head in a direction transverse to the direction of movement of the sliding head 64. The member 70 has a portion of its upper surface formed as a rack 72 and this rack meshes with the pinion 69 on the sleeve secured to the stub shaft of the clamping device. It will be clear that on movement of the member 70 transversely of the direction of movement of the sliding head 64 the clamping means is rotated imparting a twist to the workpiece issuing from the shaping rollers 14, 21.

The sliding of the rack member 70 is controlled by a cam device which (Figures 8 and 10) comprises a trough-like base secured to the machine bed plate having side walls 75 between which are disposed a number of pairs of jaws which hold a flexible laminated spring steel strip 76 in a desired position at each of a number of points in its length, the strip extending across the trough from adjacent one wall towards the other wall 75.

Figures 8, 9:
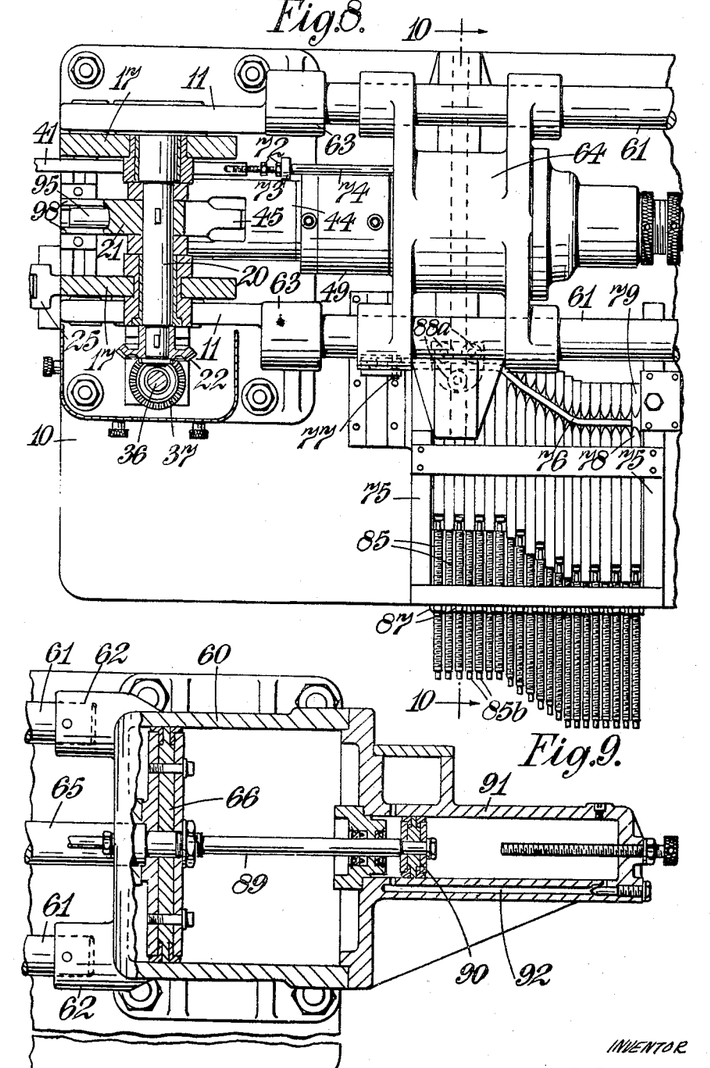
Figure 8 is a section on the line 8—8 of Figure 7.
Figure 9 is an extension of the right hand side of the apparatus shown in Figure 8.
Figure 10:
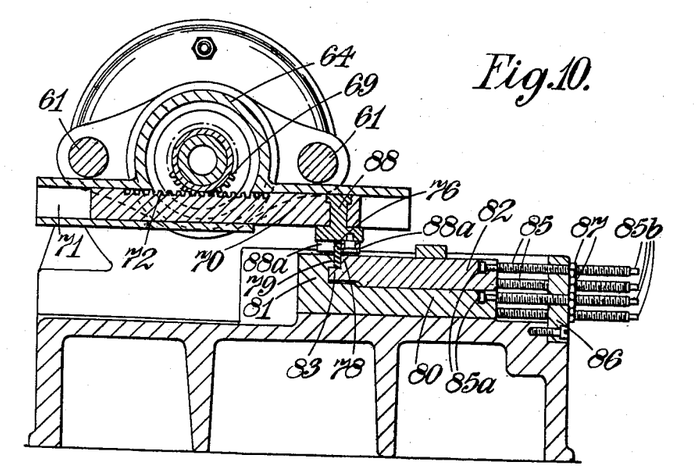
Figure 10 is a section on the line 10—10 of Figure 8.

Each pair of jaws comprises a front jaw 78 and a rear jaw 79, the front jaw co-operating with one surface of the strip 76 and the rear jaw co-operating with the other surface of the strip 76. The strip is received edgewise between the pairs of jaws and one edge portion of the strip projects from the jaws thus to afford the camming surface of the cam device.

Each rear jaw 79 comprises a bar 80 slidable on the bottom of the trough-like base and having at one end an upstanding portion 81 terminating at its upper end in a projection affording the jaw 79 which overhangs the bar 80 and is tapered at its end. The lower end of the projection 79 lies above the upper surface of the bar 80.

Each front jaw 78 comprises a bar 82 which slides upon the upper surface of the bar 80 of the co-operating rear jaw 79 and has a projection 83 to engage beneath the projection 79. The end of the bar 82 adjacent the projection 83 is tapered to form the front jaw 78. The projection 83 not only guides the bar 82 of the front jaw 78 in its sliding movement relative to the bar 80 of the rear jaw, but also the projection limits the extent to which the strip 76 can be entered between the jaws.

Each bar 80, 82 has adjacent its end remote from the jaws 79, 78 a transverse slot and a longitudinal slot which extends from the transverse slot to the end of the bar 80, or 82 remote from the jaw. The bars are disposed with their slots alternately uppermost and lowermost across the respective jaw layers.

Each bar has associated with it adjusting means by which it and its associated jaw can be adjusted transversely of the general direction in which the strip extends across the trough-like base. The means comprises for each bar a threaded rod 85 having a head 85a occupying the corresponding transverse slot and having its threaded portion extending through the corersponding longitudinal solt and through a corresponding threaded aperture in an end wall 86 of the trough-like base. The outer ends 85b of the threaded rods 85 are square to receive an adjusting key, and it will be appreciated that by rotating each rod the corresponding jaw can be caused to slide relative to the other jaws. Each rod 85 carries a lock nut 87, by which after adjustment of the rod to properly position its associated jaw, the rod 85 can be locked in position.

The rack member 70 co-operates with the strip cam 76 by three rollers 88a mounted on a member 88 which is rotatably mounted in member 70, two of the rollers 88a co-operate with and are spaced lengthwise of one surface of the flexible strip cam member 76, and the other roller 88 is arranged to co-operate with the opposite surface of the flexible strip 76.

In each construction, the piston of the main pneumatic ram for moving the sliding head is connected by rod 89 to the piston 90 of a dashpot device, which piston 90 works in an oil-filled cylinder 91 the ends of which are interconnected through a restricted passage 92, this reduces any tendency that the ram piston may have to judder in operation.

The first shaping roller 14 has its periphery formed with a working surface to produce the concave surface of a blade, the working surfaces having an angular extent with respect to the axis of rotation of the roller of about 270° and the remainder of the periphery being cut away for the purpose described below.

The second shaping roller 21 has its periphery formed with a working surface to produce the convex surface of a blade, the working surfaces having an angular extent with respect to the axis of rotation of the second shaping roller of about 270° and the remainder of the periphery being cut away for the purpose described below.

The rollers 14, 21 have co-operating cylindrical lands on each side of their working surfaces so as to define the extent to which they can move towards each other.

Figure 6:
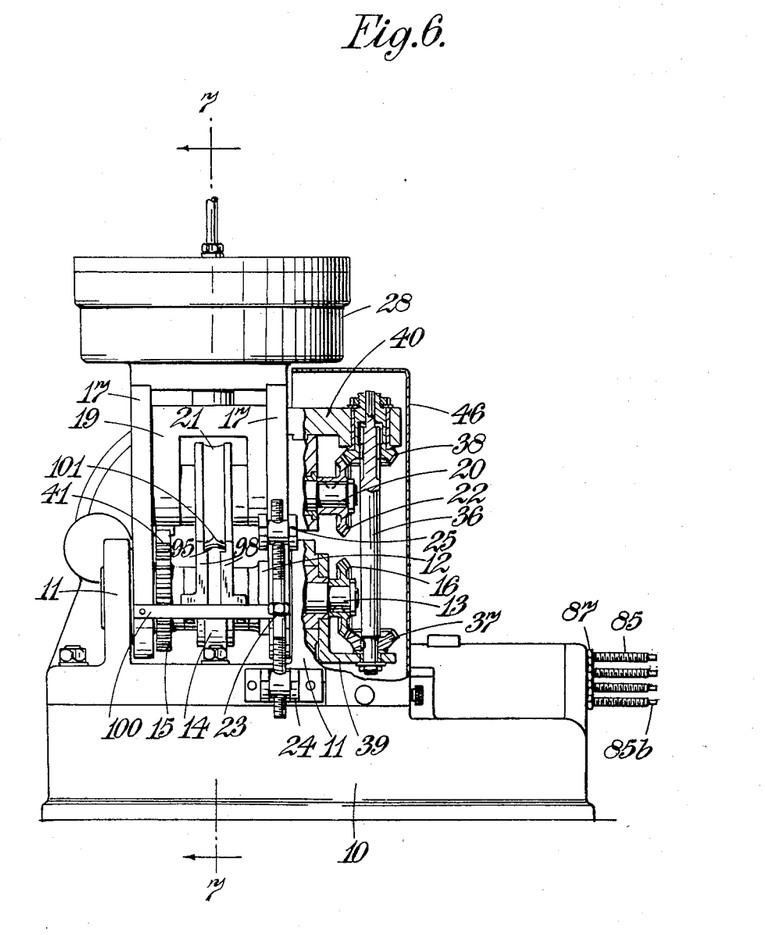
Figure 6 is an end view of the second construction of apparatus for forming and twisting blades, parts being broken away.
Figure 7:
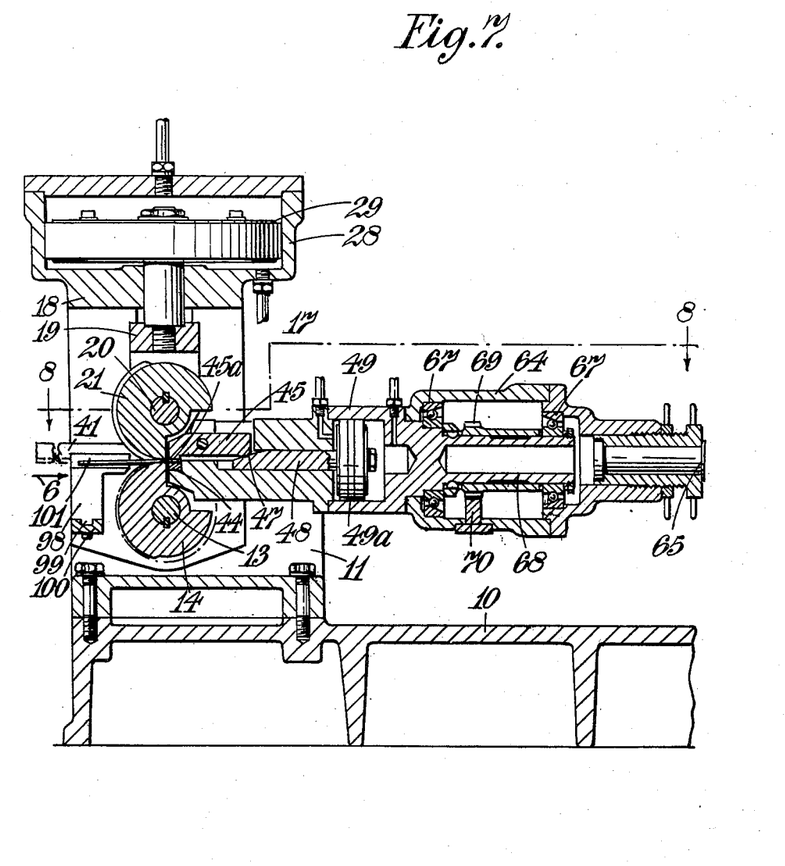
Figure 7 is a section on the line 7—7 of Figure 6.

The first and second shaping rollers 14, 21 have such axial profiles at each angular position of their working surfaces that, as the shaping rollers are rotated in unison, a bite is formed which at each instant will produce a desired aerodynamic profile in a strip of initially uniform aerodynamic profile being fed through the bite at a linear speed equal to the peripheral speed of the rollers. The workpiece is fed into the bite between the rollers from a workpiece support carried between the side plates 17. In Figures 3 and 5, the support is a table 93 having thereon a longitudinal rib 94 extending parallel to the direction of the feed of the workpiece 95 and a peg 96 spaced from the rib by a distance equal to the width of workpiece 95. The table 93 is secured to a side plate 17 by set screws 97. In Figures 6 to 8, the workpiece support consists of two pillars 98 mounted in a guideway 99 in a member 100 secured to the side plates 17 with the guideway 99 parallel with the axis of the rollers 14, 21. The inwardly-facing surfaces of the pillars each have a cutaway 101 in them to produce a guiding channel through which the workpiece 95 is drawn. The width of the channel may be adjusted to accommodate blades of different sizes by adjustment of the pillars 98 along the guideway 99.

Figures 11, 12:
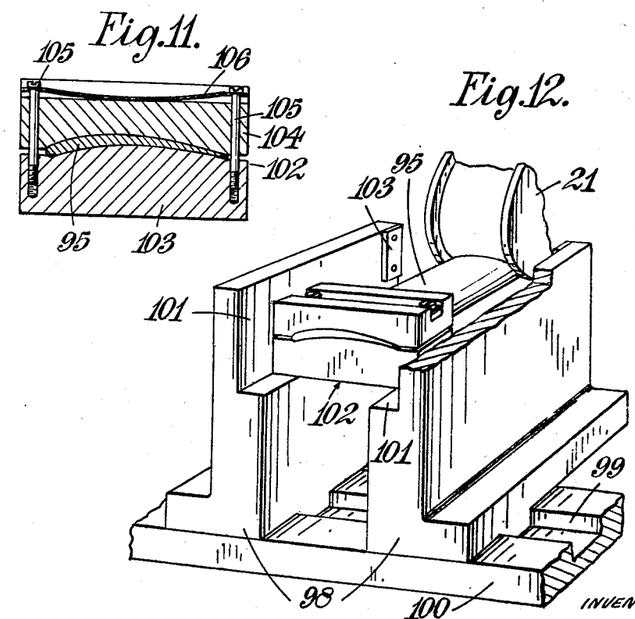
Figure 11 is a section through a clip for feeding a blade blank into the apparatus.
Figure 12 is a perspective view of part of the apparatus showing a blade blank being fed into the apparatus.

The blade blank need not itself directly contact the walls of the channel but may be carried in a clip which is drawn through the channel till it meets a stop when the blade blank is drawn out of the cilp. Such a clip is shown in Figures 11 and 12. The clip 102 consists of two members 103 and 104; two bolts 105 pass through holes in member 104 and are threaded into member 103. The inner surfaces of members 103, 104 are shaped to conform respectively to the concave and convex purposes of the blade blank 95. The members 103, 104 are loaded to grip the blank by means of a flexible metal strip 106. As the blade blank is drawn between the rollers 14, 21 the clip 102 guides the blank along the channel formed by the cutaways 101 until the clip meets a stop 103 upon which the blank is drawn out of the clip. Possible damage to the blank by it contacting the walls of the channel is thus avoided.

Alternatively it may be arranged that the pillars themselves move with the blank towards the rollers till they meet a stop upon which the blank is drawn out of the channel.

In operation of either construction of apparatus above described, a length of strip of uniform aerofoil cross-section is fed from the workpiece support between the bite formed by the shaping rollers 14, 21 to enable the first issuing end to be gripped between the clamp pads 44a, 45a. The shaping rollers 14, 21 are in a position in which the cutaways in their peripheries are adjacent one another and this enables the clamping means for the workpiece 95 to be fed to close to the bite. When the workpiece 95 is engaged between the clamp pads 44a, 45a, compressed air is fed to the wedge operating ram 49 to grip the workpiece.

Compressed air is now fed to the ram device 28 at the upper end of the swinging frame 17, 18 thereby to load the shaping rollers 14, 21 into contact with the workpiece 95, and compressed air is then fed to the main operating ram 51, or 60 to draw the workpiece 95 through the bite and simultaneously by means of the rack 41 to rotate the shaping rollers 14, 21 with a peripheral speed equal to the rate of feed of the workpiece 95.

If a non-twisted blade is required the profile plates 55 or the cam strip 76 will have straight profiles parallel to the direction of travel of the main ram and so the leading end of the workpiece 95 will not be twisted as the workpiece is drawn through the shaping rollers 14, 21. If, however, a twisted blade is required the profile plates 55 are or cam strip 76 is given such edge profile that the clamping means is constrained to rotate about its axis, thus twisting the workpiece as it is drawn through the bite. The twist imparted to the workpiece may be varied by varying the angle of rotation of the tubular member per unit length of its linear travel.

When a twisted blade is being made, the swinging frame 17, 18 is adjusted so that the shaping rollers 14, 21 are offset to one another in the direction of travel of the workpiece 95 to eliminate bowing of the resulting blade. Thus, if the blade is a rotor blade (which therefore has greatest twist at its tip and least at its root) and if as above described the lower shaping roller 14 is for forming the concave face and the upper roller 21 is for forming the convex face, it is necessary to arrange that the upper shaping roller 21 is offset from the lower shaping roller 14 in the direction opposite to the direction of travel of the workpiece 95.

It will be understood that the profiles of the shaping rollers are such as apparently to produce a blade having a greater camber than is required at each section, this exaggeration of the profile being necessary to allow for spring-back of the blade after it has left the bite between the rollers. Similarly the twist given to the workpiece as it is passing through the bite will be greater than is required in the finished blade.

I claim:

1. In a method of forming a twisted, aerodynamic-section blade having a varying camber along the length thereof, comprising the steps of cutting off a blade length from strip material having a basic, uniform, constant camber, passing the blade length between a pair of rollers having at each angular location a bite of aerodynamic cross-section capable of modifying the camber of the basic section, modifying the camber of the basic section by passage through said rollers without substantial displacement of metal from cross-section to cross-section, the linear speed of the blade length in passing between the rollers being substantially equal to the peripheral speed of the working surfaces of said rollers, applying pressure along the blade length between said rollers for modifying the camber of the aerodynamic cross-section at points in the blade length, and simultaneously imparting a twist to the blade by holding and rotating the leading end of the blade about the lengthwise axis thereof and relative to the bite as said blade issues from the bite.

2. In a method as set forth in claim 1, including the step of offsetting said pair of rollers with respect to each other to eliminate bowing of the resultant blade.

References Cited in the file of this patent
UNITED STATES PATENTS

| | | |
|---|---|---|
| 1,106,928 | Denk | Aug. 11, 1914 |
| 1,448,001 | Refior | Mar. 13, 1923 |
| 1,543,880 | Sheehan | June 30, 1925 |
| 1,840,059 | Smith | Jan. 5, 1932 |
| 1,883,519 | Brauchler | Oct. 18, 1932 |
| 2,013,622 | Bedford | Sept. 3, 1935 |
| 2,019,329 | Warren | Oct. 29, 1935 |
| 2,044,293 | Handler | June 16, 1936 |
| 2,057,924 | Smith | Oct. 20, 1936 |
| 2,063,706 | Solderberg | Dec. 8, 1936 |
| 2,138,127 | Squires | Nov. 29, 1938 |
| 2,157,679 | Schmidt | May 9, 1939 |
| 2,221,679 | Heckman | Nov. 12, 1940 |
| 2,356,783 | Natzke | Aug. 29, 1944 |
| 2,654,277 | Hedlund | Oct. 6, 1953 |

FOREIGN PATENTS

| | | |
|---|---|---|
| 83,535 | Switzerland | Dec. 16, 1919 |
| 139,184 | Great Britain | June 17, 1921 |